United States Patent Office 3,033,680
Patented May 8, 1962

3,033,680
PLASTICIZED GELATIN COMPOSITIONS
Kirby M. Milton and Fred W. Spangler, Rochester, N.Y., assignors to Eastman Kodak Company, Rochester, N.Y., a corporation of New Jersey
No Drawing. Filed Jan. 13, 1958, Ser. No. 708,360
10 Claims. (Cl. 96—94)

This invention relates to plasticized gelatin compositions such as gelatin coating compositions or photographic emulsions in which an ether-ester or a diester of an alkylene glycol or of a poly(alkylene glycol) is used as the plasticizer.

Gelatin coatings on supports, for example, silver halide-gelatin emulsion layers often tend to crack when flexed, especially at low humidities. Various materials have been suggested for incorporation in gelatin coatings to improve the flexibility characteristics thereof, but most of these exhibit disadvantages of one kind or another. One object of our invention is to provide plasticized gelatin compositions. Another object of our invention is to plasticize gelatin layers without imparting excessive softness or tackiness to them under high humidity and high temperature conditions, as is often the case with commonly known plasticizers. A further object of our invention is to prepare gelatin coating compositions containing as the plasticizer therein an ether-ester or a diester of an alkylene glycol or of a poly(alkylene glycol).

We have found that by the incorporation of 5–30% based on the weight of the gelatin of an ester-ether or a diester derivative of an alkylene glycol or of a poly(alkylene glycol), that compositions are obtained which coat out in the form of layers that have good flexibility characteristics and are free of excessive softness and tackiness. The materials which are useful for plasticizing gelatin are those having the formula:

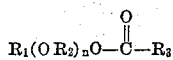

in which $R_1$=alkyl, acyl, or alkoxyacyl, $R_2$=alkylene, $R_3$=alkyl or alkoxy alkyl, and $n$=a simple integer from 1 to 8.

Some compounds which have been found to be good plasticizers and the $R_1$, $R_2$ $R_3$, and $n$ values thereof are as follows:

graphic emulsions were prepared as follows: (1) Aqueous solutions containing 8% of photographic gelatin and the indicated percentage of plasticizer were coated on silicone-treated glass plates in such volume that dried thicknesses of 4 mils were obtained. The sheets were cured at 70° F., and 70% relative humidity until dry. They were then stripped from the plates, slit to widths of 15 mm. and conditioned to 70° F., 20% relative humidity. Their folding endurance was tested with an MIT fold tester using a tension of 1 kg. and jaws of 0.0155 inch radius of curvature with a separation of 0.01 inch. (2) Sheets of silver halide emulsions, similarly plasticized, were prepared and evaluated in the same manner. The results obtained were as follows:

| Percent [1] | Plasticizer | MIT folds [2] at 70° F., 20% R.H. ||
|---|---|---|---|
| | | Gelatin sheets | Emulsion sheets |
| 0 | None | 24 | 14 |
| 20 | "Methoxy Triglycol Acetate" | 100 | 112 |
| 20 | Glycerin | 65 | 56 |

[1] Parts per 100 parts of gelatin.
[2] Increase in MIT fold values shows increase in flexibility.

Example 2

Sheets were prepared in the same manner as in the preceding example but using varied concentrations of methoxy triglycol acetate. The results obtained were as follows:

| Percent | Plasticizer | MIT folds at 70° F., 20% R.H. ||
|---|---|---|---|
| | | Gelatin sheets | Emulsion sheets |
| 0 | None | 24 | 14 |
| 5 | "Methoxy Triglycol Acetate" | 24 | 31 |
| 10 | ...do... | 41 | 112 |
| 15 | ...do... | 63 | 132 |
| 20 | ...do... | 82 | 191 |
| 20 | Glycerin | 49 | 54 |

| | $R_1$ | $R_2$ | $R_3$ | $n$ |
|---|---|---|---|---|
| 2-methoxyethyl acetate, i.e., methyl Cellosolve acetate | $CH_3-$ | $-CH_2CH_2-$ | $CH_3-$ | 1 |
| 2-ethoxyethyl acetate, i.e., Cellosolve acetate | $C_2H_5-$ | $-CH_2CH_2-$ | $CH_3-$ | 1 |
| 2-(2-methoxyethoxy)ethyl acetate, i.e., methyl Carbitol acetate | $CH_3-$ | $-CH_2CH_2-$ | $CH_3-$ | 2 |
| 2-(2-ethoxyethoxy)ethyl acetate, i.e., Carbitol acetate | $C_2H_5-$ | $-CH_2CH_2-$ | $CH_3-$ | 2 |
| 2-(2-butoxyethoxy)ethyl acetate, i.e., butyl Carbitol acetate | $C_4H_9-$ | $-CH_2CH_2-$ | $CH_3-$ | 2 |
| 2-(2-(2-methoxyethoxy)ethoxy)ethyl acetate i.e., methoxy triglycol acetate | $CH_3-$ | $-CH_2CH_2-$ | $CH_3-$ | 3 |
| 2-(2-(2-ethoxyethoxy)ethoxy)ethyl acetate, i.e., ethoxy triglycol acetate | $C_2H_5-$ | $-CH_2CH_2-$ | $CH_3-$ | 3 |
| 2-(2-methoxyethoxy-ethyl propionate, i.e., methyl Carbitol propionate | $CH_3-$ | $-CH_2CH_2-$ | $C_2H_5-$ | 2 |
| Glycol diacetate | $CH_3CO$ | $-CH_2CH_2-$ | $CH_3-$ | 1 |
| Triethylene glycol diacetate | $CH_3CO$ | $-CH_2CH_2-$ | $CH_3-$ | 3 |
| Triethylene glycol dipropionate | $C_2H_5CO$ | $-CH_2CH_2-$ | $C_2H_5-$ | 3 |
| 2-(2-methoxyethoxy)ethyl methoxyacetate, i.e., methyl Carbitol methoxyacetate | $CH_3-$ | $-CH_2CH_2-$ | $CH_3OCH_2-$ | 2 |
| 2-methoxypropyl acetate, i.e., methoxy propylene glycol acetate | $CH_3-$ | $-CH_2\overset{CH_3}{\underset{\|}{C}H}-$ | $CH_3-$ | 1 |
| 2-(2-methoxypropoxy)propyl acetate, i.e., methoxy dipropylene glycol acetate | $CH_3-$ | $-CH_2\overset{CH_3}{\underset{\|}{C}H}-$ | $CH_3-$ | 2 |
| 2-(2-(2-methoxypropoxy)propoxy)propyl acetate i.e., methoxy tripropylene glycol acetate | $CH_3-$ | $-CH_2\overset{CH_3}{\underset{\|}{C}H_2}-$ | $CH_3-$ | 3 |

The following examples illustrate the invention:

Example 1

Thin sheets of gelatin and of silver halide-gelatin photo-

Example 3

Sheets were prepared and tested in the same manner as in Example 1 but using diesters as the plasticizers, instead of the ether-ester of Example 1. The results obtained were as follows:

| Percent | Plasticizer | MIT folds at 70° F., 25% R.H. | |
|---|---|---|---|
| | | Gelatin sheets | Emulsion sheets |
| 0 | None | 24 | 14 |
| 20 | Glycol diacetate | 25 | 9 |
| 20 | Triethylene glycol diacetate | 63 | 4 |
| 20 | Triethylene glycol dipropionate | 55 | 0 |

Example 4

A negative-type silver halide-gelatin photographic emulsion was used to prepare sheets having plasticizer contents of the kind and proportion as indicated below. This emulsion was coated onto a cellulose acetate support and dried at the highest possible temperature without remelting. The following results were obtained:

| Percent | Plasticizer | Brittleness, 70° F., 15% RH | | Tackiness | | |
|---|---|---|---|---|---|---|
| | | Wedge [1] increase | MIT Folds | Sward rocker,[2] 70° F., 80% RH, Damping time, sec. | Coefficient of friction (emulsion to emulsion) | |
| | | | | | 70° F., 50% RH | 70° F., 70% RH |
| 0 | None | 0.23 | 0 | 49 | 0.47 | 0.44 |
| 10 | "Methoxy Triglycol Acetate" | 0.10 | 12 | 45 | 0.49 | 0.44 |
| 20 | do | 0.11 | 17 | 45 | 0.46 | 0.49 |
| 20 | Glycerin | 0.29 | 6 | 23 | 0.52 | 0.82 |

[1] Decrease in wedge brittleness values indicates an increase in flexibility.
[2] A decrease in sward rocker time and an increase in coefficient of friction indicate increase in tackiness and/or softness.

Example 5

Another series of coatings was prepared and evaluated as described in Example 4. The results obtained were as follows:

| Percent | Plasticizer | Brittleness, 70° F., 15% RH | | Tackiness | | |
|---|---|---|---|---|---|---|
| | | Wedge [1] increase | MIT folds | Sward rocker,[2] 70°F., 80% RH, damping time, sec. | Coefficient of friction (emulsion to emulsion) | |
| | | | | | 70° F., 50% RH | 70° F., 70% RH |
| 0 | None | 0.20 | 1 | 49 | 0.45 | 0.48 |
| 20 | "Methoxy Triglycol Acetate" | 0.10 | 19 | 45 | 0.38 | 0.47 |
| 20 | Glycerin | 0.15 | 15 | 27 | 0.46 | 0.80 |

Example 6

Another series of coatings was prepared in a manner similar to that of the preceding examples using a photographic emulsion, the concentration of methoxy triglycol acetate having been varied. The results were as follows:

| Percent | Plasticizer | Brittleness, 70° F., 15% RH | | Tackiness | | |
|---|---|---|---|---|---|---|
| | | Wedge [1] increase | MIT folds | Sward rocker,[2] 70°F., 80% RH, damping time, sec. | Coefficient of friction (emulsion to emulsion) | |
| | | | | | 70° F., 50% RH | 70° F., 70% RH |
| 0 | None | 0.22 | 1 | 44 | 0.45 | 0.47 |
| 5 | "Methoxy Triglycol Acetate" | 0.25 | 0 | 41 | 0.43 | 0.46 |
| 10 | do | 0.13 | 16 | 45 | 0.43 | 0.47 |
| 15 | do | 0.10 | 20 | 43 | 0.44 | 0.50 |
| 20 | do | 0.14 | 23 | 42 | 0.43 | 0.50 |
| 25 | do | 0.13 | 26 | 41 | 0.44 | 0.49 |
| 30 | do | 0.15 | 24 | 42 | 0.47 | 0.50 |
| 20 | Glycerin | 0.19 | 15 | 22 | 0.44 | 1.01 |

Example 7

A negative-type silver halide-gelatin photographic emulsion was used to prepare a variety of coatings, the compositions being indicated below. After these emulsion compositions were prepared, they were coated onto cellulose acetate support and dried at the highest possible temperature. The results obtained were as follows:

In the various cases above, the plasticizer was added directly to the gelatin coating composition prior to its use in a coating operation. However, it is to be understood that other means may be used to incorporate the plasticizer in the gelatin. For instance, the plasticizer

| Percent | Plasticizer | Brittleness (15% RH, 70 °F.) | | Tackiness and/or softness | | |
|---|---|---|---|---|---|---|
| | | Wedge increase | MIT folds | Sward rocker 80% RH, 70° F., damping time, sec. | Coefficient of friction metal to emul., 70% RH, 70° F. | Ferrotyping [1] rating 7 days at 120° F. |
| 0 | None | 0.27 | 0 | 52 | 0.21 | 2-3 |
| 20 | Methyl Cellosolve acetate | 0.31 | 0 | 50 | 0.23 | 1 |
| 20 | Cellosolve acetate | 0.20 | 11 | 53 | 0.21 | 1 |
| 20 | Methyl Carbitol acetate | 0.09 | 15 | 50 | 0.33 | 3 |
| 20 | Carbitol acetate | 0.14 | 17 | 52 | 0.34 | 2 |
| 20 | Butyl Carbitol acetate | 0.24 | 3 | 52 | 0.36 | 2 |
| 20 | Methoxy triglycol acetate | 0.12 | 20 | 47 | 0.29 | 2 |
| 20 | Glycerin | 0.21 | 14 | 31 | 0.69 | 5 |

[1] Ferrotyping was rated from 0 (none) to 6 (complete) and is a measure of the tendency of the emulsion to soften and flow under conditions of test.

*Example 8*

Another set of coatings was prepared and evaluated in a similar manner, using a gelatin-silver halide photographic emulsion, the compositions being indicated below. The results obtained were as follows:

may be imbibed from a solution by the gelatin layer or by contacting the gelatin layer with another layer containing the plasticizer under such conditions that the plasticizer will migrate into the gelatin layer. The following examples illustrate imbibing plasticizer from solution:

*Example 10*

An unplasticized negative-type photographic emulsion

| Percent | Plasticizer | Brittleness, 15% RH, 70° F. | | Sward rocker, 80% RH, 70° F., damping time, sec. | Coefficient of friction, metal to emul., 70% RH, 70° F. | Ferrotyping rating (raw; 70% RH), 7 days at 100° F. |
|---|---|---|---|---|---|---|
| | | Wedge increase | MIT folds | | | |
| 0 | None | 0.21 | 0 | 43 | 0.26 | 1-2 |
| 20 | Methyl Carbitol acetate | 0.07 | 21 | 40 | 0.29 | 3-4 |
| 20 | Methoxy triglycol acetate | 0.08 | 23 | 38 | 0.28 | 3 |
| 20 | Ethoxy triglycol acetate | 0.11 | 23 | 39 | 0.36 | 5 |
| 20 | Methyl Carbitol propionate | 0.11 | 16 | 40 | 0.28 | 2 |
| 20 | Methyl Carbitol methoxyacetate | 0.07 | 22 | 40 | 0.29 | 1 |
| 20 | Methoxy propylene glycol acetate | 0.25 | 0 | 42 | 0.21 | 3 |
| 20 | Methoxy dipropylene gylcol acetate | 0.20 | 5 | 40 | 0.33 | 5 |
| 20 | Glycerin | 0.26 | 0 | 23 | 1.06 | 4 |

*Example 9*

Samples of a negative-type silver halide-gelatin photographic emulsion were plasticized with the compounds and in the amounts indicated below, coated onto cellulose acetate support, and dried at the highest possible temperature. The coatings obtained were evaluated and the following results were obtained:

was coated out in the form of raw film. Samples of this raw film were brought into contact with 2% aqueous solution of plasticizer as indicated at 70° F. for 1½ minutes, passed through rubber wringer rollers to remove any surface liquid and dried for 1 minute at 200° F. The

| Percent | Plasticizer | Brittleness, 70° F., 15% RH | | Tackiness and/or softness | | |
|---|---|---|---|---|---|---|
| | | Wedge increase | MIT folds | Sward rating, 70° F., 80% RH | Coefficient of friction (metal to emul.) 70° F., 70% RH | Ferrotyping (60% RH) 7 days at 120° F. |
| 0 | None | 0.27 | 0 | 52 | 0.21 | 2-3 |
| 20 | Glycol diacetate | 0.30 | 0 | 53 | 0.25 | 2 |
| 20 | Triethylene glycol diacetate | 0.21 | 12 | 50 | 0.33 | 2-3 |
| 20 | Triethylene glycol dipropionate | 0.25 | 1 | 52 | 0.31 | 2-3 |
| 20 | Glycerin | 0.21 | 14 | 31 | 0.69 | 5 | brittleness of the films was evaluated and the following results were obtained:

| Plasticizer | Solution conc., percent | Brittleness (70° F., 15% R.H.) | |
|---|---|---|---|
| | | Wedge increase | MIT folds |
| Sample: | | | |
| A—None | 0 | 0.24 | 0 |
| A1—Triethylene glycol diacetate | 2 | 0.15 | 22 |
| A2—Glycerin | 2 | 0.23 | 0 |
| B—None | 0 | 0.22 | 0 |
| B1—Triethylene glycol diacetate | 2 | 0.15 | 9 |
| B2—Glycerin | 2 | 0.23 | 0 |

Certain film coatings are desensitized locally by strains produced in the emulsions by bending the sheets sharply or kinking them. This so called "kink" desensitization is well known and is a serious problem in handling large sheets of some kinds of film, for example X-ray film. The following example illustrates the usefulness of the plasticizers of our invention in reducing "kink" desensitization.

Example 11

A high-speed panchromatic-sensitized gelatin silver halide emulsion was divided into several parts and treated as indicated below. The parts were coated onto a cellulose acetate support, dried, exposed on an Eastman Ib Sensitometer and processed with the indicated results. The plasticizers used and the amounts employed plus the results of evaluation of the product were as follows:

| Plasticizer | Plasticizer concentration based on weight of gelatin, percent | Sensitometric results | | | Wedge [1] bending sensitivity 70° F., 50% RH, wedge opening 0.150 in. | Sward rocker tackiness, test time in second avg. |
|---|---|---|---|---|---|---|
| | | Relative film speed | Gamma | Fog | | |
| Glycerin | 8 | 100 | 0.93 | 0.04 | Bad | 28 |
| Triethylene glycol diacetate | 16 | 100 | 0.95 | 0.04 | Medium | 27 |

[1] The "wedge bending sensitivity" is a measure of the tendency to show kink desensitization as the result of strains.

The Sward Rocker results show that the improved resistance to kink desensitization was obtained without any appreciable increase in softness or tackiness.

Example 12

An emulsion similar to that described in preceding Example 11 was divided into parts, treated as indicated below, and tested in the same manner as in that example. The results obtained in those tests were as follows:

| Plasticizer | Concentration based on weight of gelatin, percent | Sensitometric results | | | Wedge bending sensitivity 70°F., 50% RH, wedge opening 0.200 inch |
|---|---|---|---|---|---|
| | | Relative film speed | Gamma | Fog | |
| Glycerin | 8 | 100 | 0.86 | 0.04 | Bad. |
| Triethylene glycol diacetate | 16 | 100 | 0.84 | 0.04 | Medium. |
| $CH_3(OCH_2CH_2)_8OCOCH_3$ | 16 | 88 | 0.87 | 0.04 | Do. |
| $CH_3(OCH_2CH_2)_8$—acyl [1] | 16 | 88 | 0.83 | 0.04 | Do. |

[1] Ricinoleoyl: $-CH=CH-CH_2-CH(OH)-(CH_2)_5-CH_3$.

In Examples 11 and 12 the plasticizers of our invention were used in higher concentration than was the glycerin. Although glycerin would plasticize better in higher proportion, use of that higher concentration of glycerin is precluded because of the severe tackiness which occurs with the use of considerable amounts of glycerin. The plasticizers in accordance with our invention, however, can be used without introducing a tackiness problem.

Often in the use of poly(alkylene glycols) and the alkylene glycol derivatives, including the plasticizers of our invention, there is a tendency towards decomposition when those compounds are affected by certain stimuli such as light, heat, or possibly the presence of impurities. When this occurs, it may become necessary that the material be subjected to some sort of a purification treatment prior to use unless some additive is employed to inhibit the deterioration. We have found that the addition of a minute amount of sodium diethylene dithiocarbamate to compositions containing poly(alkylene glycols) or other alkylene glycol derivatives, acts to increase the stability of those compositions. We have found that it is desirable to employ the sodium diethylene dithiocarbamate in the portion of 0.01% of the weight of the glycol, to obtain an effective stabilizing action. Any proportion above this value will be effective such as up to 1% or even up to 5% or more.

The plasticizing materials of our invention are especially useful in gelatin compositions intended for photographic applications. We have found that the use of those glycol derivatives in accordance with our invention, in sufficient amounts to effectively plasticize photographic emulsions at low humidities, does not cause any undesirable changes in physical or sensitometric properties even when subjected to high humidities and temperatures. Thus, for example, the objectionable tackiness and excessive softness characteristic of glycerin plasticizing is obviated.

The photographic emulsions used in practicing our invention are of the developing-out type.

The emulsions can be chemically sensitized by any of the accepted procedures. The emulsions can be digested with naturally active gelatin, or sulfur compounds can be added such as those described in Sheppard U.S. Patents 1,574,944 and 1,623,499, and Sheppard and Brigham 2,410,689.

The emulsions can also be sensitized with salts of the noble metals, as described in Smith and Trivelli U.S. Patent 2,448,060.

The emulsions can also be chemically sensitized with gold salts as described in Waller and Dodd U.S. Patent 2,399,083 or stabilized with gold salts as described in Damschroder U.S. Patent 2,597,856 and Yutzy and Leermakers U.S. Patent 2,597,915.

The emulsions can also be chemically sensitized with reducing agents such as those disclosed in Carroll U.S. Patent 2,487,850, Lowe and Jones U.S. Patent 2,518,698;

Lowe and Allen U.S. Patent 2,521,925; and Lowe et al. U.S. Patents 2,521,926, 2,743,182, and 2,743,183.

The emulsions can also be optically sensitized with cyanine and merocyanine dyes, such as those described in Brooker U.S. Patents 1,846,301; 1,846,302; and 1,942,- 854; White U.S. Patent 1,990,507; Brooker and White U.S. Patents 2,112,140; 2,165,338; 2,493,747; and 2,739,- 964; Brooker and Keyes U.S. Patent 2,493,748; Sprague U.S. Patents, 2,503,776 and 2,519,001; Brooker and Heseltine U.S. Patent 2,666,761; Heseltine U.S. Patent 2,734,- 900; Van Lare U.S. Patent 2,739,141; and Kodak Limited British Patent 450,958.

The emulsions can also be stabilized with the compounds of Allen, Byers, and Murray U.S. Patent 2,728,- 663; Carroll and Murray U.S. Patent 728,664; Leubner and Murray U.S. Patent 2,728,665; Carroll U.S. Patent 2,716,062; Brooker and Staud U.S. Patent 2,131,038; Jones U.S. patent application Ser. No. 493,047; Trivelli and Smith U.S. Patents 2,566,245 and 2,566,263.

The emulsions may also contain the speed-increasing compounds of Carroll U.S. Patent 2,271,623; Carroll and Allen U.S. Patent 2,288,226; Carroll and Spence U.S. Patent 2,334,864; and Carroll and Beach U.S. Patent 2,708,162.

The emulsions can also contain plasticizing agents, such as glycerin or those described in Murray and Milton U.S. patent application Ser. No. 588,951; Milton U.S. patent application Ser. No. 662,564; Gates and Illingsworth U.S. patent application Ser. No. 527,872; Gray U.S. patent application Ser. No. 604,333; and Tong U.S. patent application Ser. No. 311,319. They may be added to the emulsion before or after any sensitizing dyes which are used.

The emulsions can be hardened with formaldehyde or other gelatin hardeners, such as those described in White U.S. Patent 2,080,019; Allen and Carroll U.S. Patents 2,725,294 and 2,725,295; Allen and Byers U.S. Patent 2,725,305; Allen and Laakso U.S. Patent 2,726,162; July, Knott and Pollak U.S. Patent 2,723,316; Allen and Burness U.S. patent application Ser. No. 556,031; Allen and Webster U.S. patent application Ser. No. 599,891; and Jeffreys U.S. patent application Ser. No. 624,968.

The emulsions can contain coating aids, such as saponin for those described in Knox and Davis U.S. Patent 2,719,- 087; Knox and Twardokus, U.S. Patent 2,739,891; Knox and Davis U.S. patent application Ser. No. 485,424; Wilson, Knox, and Stenberg U.S. patent application Ser. No. 485,812; Knox and Wright U.S. patent application Ser. No. 556,055; Knox and Wilson U.S. patent application Ser. No. 600,679; and Knox and Stenberg U.S. patent application Ser. No. 691,125.

Various silver salts may be used as the sensitive salt, such as silver bromide, silver iodide, silver chloride, or mixed silver halides such as silver chlorobromide or silver bromoiodide.

The agents of the instant application may be used in emulsions intended for color photography, for example, emulsions containing color-forming couplers or other materials that will generate color images, emulsions to be developed by solutions containing couplers or other color-generating materials, emulsions of the mixed packet type, such as described in Godowsky U.S. Patent 2,698,794, or emulsions of the mixed grain type, such as described in Carroll and Hanson U.S. Patent 2,592,243. These agents can also be used in emulsions which form latent images predominantly on the surface of the silver halide crystal or in emulsions which form latent images predominantly inside the silver halide crystal, such as those described in Davey and Knott U.S. Patent 2,592,250.

They may also be used in emulsions intended for use in silver halide solvent transfer processes, such as those described in Rott U.S. Patent 2,352,014; Land U.S. Patents 2,584,029, 2,698,236, and 2,543,181; and Yackel et al. U. S. patent application Ser No. 586,705, or in color transfer processes, such as those described in Land U.S. Patents 2,559,643, 2,698,798; Belgian Patents 554,933, 554,934, 554,935 and 554,212; Yutzy U.S. Patent 2,- 756,142; and Whitmore U.S. patent application Ser. No. 570,179.

The dispersing agent for the silver halide may be gelatin or other colloidal material, such as collodion, albumin, cellulose derivatives or synthetic resins, for example, polyvinyl compounds. Some of the colloids that may be used are described in Lowe U.S. Patent 2,286,215; Lowe and Clarke U.S. Patent 2,327,808; Lowe, Minsk, and Kenyon U.S. Patent 2,541,474; Lowe U.S. Patent 2,563,791, Unruh and Smith U.S. Patent 2,768,154; and Unruh et al. U.S. Patent 2,808,331. Compatible mixtures of two or more of these colloids may be used.

In addition, combinations of these antifoggants, sensitizers, hardeners, etc., may be used.

We claim:

1. As a composition of matter adapted for use in making photographic products a homogeneous mixture of gelatin and 5–30%, based on the weight of the gelatin, of a 100–300 molecular weight plasticizer compound having the formula:

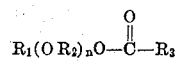

in which $R_1$ is a radical selected from the group consisting of alkyl and acyl, $R_2$ is an alkylene radical, $R_3$ is alkyl and $n$ is a simple integer from 1 to 8.

2. As a coating composition adapted for use in making photographic products an aqueous solution of a mixture of gelatin and 5–30%, based on the weight of the gelatin, of a 100–300 molecular weight plasticizer compound having the formula:

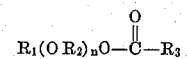

in which $R_1$ is a radical selected from the group consisting of alkyl and acyl, $R_2$ is an alkylene radical, $R_3$ is alkyl and $n$ is a simple integer from 1 to 8.

3. A silver halide photographic emulsion in which the carrier for the silver halide essentially consists of an aqueous solution of a mixture of gelatin and 5–30%, based on the weight of the gelatin, of a 100–300 molecular weight plasticizer compound having the formula:

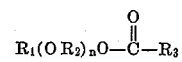

in which $R_1$ is a radical selected from the group consisting of alkyl and acyl, $R_2$ is an alkylene radical, $R_3$ is alkyl, and $n$ is a simple integer from 1 to 8.

4. As a composition of matter a homogeneous mixture of gelatin and 5–30%, based on the weight of the gelatin, of methoxy triglycol acetate as the plasticizer for the gelatin.

5. As a composition of matter a homogeneous mixture of gelatin and 5–30%, based on the weight of the gelatin, of glycol diacetate as the plasticizer for the gelatin.

6. As a composition of matter a homogeneous mixture of gelatin and 5–30%, based on the weight of the gelatin, of triethylene glycol diacetate as the plasticizer for the gelatin.

7. As a composition of matter a homogeneous mixture of gelatin and 5–30%, based on the weight of the gelatin, of 2-(2-methoxyethoxy)ethylacetate as the plasticizer for the gelatin.

8. As a composition of matter a homogeneous mixture of gelatin and 5–30%, based on the weight of the gelatin, of 2-methoxy ethylacetate as the plasticizer for the gelatin.

9. As a composition of matter a homogeneous mixture of gelatin and 20%, based on the weight of the gelatin, of methoxy triglycol acetate as the plasticizer for the gelatin.

10. A silver halide photographic emulsion in which the carrier for the silver halide essentially consists of an aqueous solution of a mixture of gelatin and 5–30%, based on the weight of the gelatin, of methoxy triglycol acetate as the plasticizer for the gelatin.

References Cited in the file of this patent

UNITED STATES PATENTS

| | | |
|---|---|---|
| 2,304,939 | Mannes et al. | Dec. 15, 1942 |
| 2,304,940 | Mannes et al. | Dec. 15, 1942 |
| 2,322,027 | Jelley et al. | June 15, 1943 |
| 2,388,164 | Loder | Oct. 30, 1945 |
| 2,732,303 | Morgan et al. | Jan. 24, 1956 |
| 2,757,089 | Moessen | July 31, 1956 |